United States Patent [19]

Bright

[11] 4,448,430
[45] May 15, 1984

[54] HOLLOW REINFORCED SEALING STRIPS

[75] Inventor: Robert G. Bright, Viersen, Fed. Rep. of Germany

[73] Assignee: Draftex Development AG, Zug, Switzerland

[21] Appl. No.: 420,529

[22] Filed: Sep. 21, 1982

[30] Foreign Application Priority Data

Jan. 27, 1982 [GB] United Kingdom ................ 8202279

[51] Int. Cl.³ .......................... E06B 7/23; F16J 15/10
[52] U.S. Cl. .................................. 277/184; 277/178; 49/491; 296/93
[58] Field of Search .................... 277/178, 182–184, 277/186, 189, 205, 206 R; 296/93; 49/475, 488, 490, 491

[56] References Cited

U.S. PATENT DOCUMENTS

| | | | |
|---|---|---|---|
| 2,607,966 | 8/1952 | Beck | 277/178 X |
| 3,078,119 | 2/1963 | Premo et al. | 296/93 X |
| 3,600,858 | 8/1971 | Savell | 49/488 |
| 4,010,573 | 3/1977 | Andrzejewski | 49/491 X |
| 4,047,751 | 9/1977 | Koike | 296/93 X |
| 4,214,036 | 7/1980 | Bright | 49/491 X |
| 4,232,081 | 11/1980 | Pullan | 49/490 X |

FOREIGN PATENT DOCUMENTS 1484962 9/1977 United Kingdom .
1511947 5/1978 United Kingdom .
2058892A 4/1981 United Kingdom .

Primary Examiner—Robert S. Ward
Attorney, Agent, or Firm—Leydig, Voit, Osann, Mayer & Holt, Ltd.

[57] ABSTRACT

Sealing strips, such as for sealing around door openings in vehicle bodies, for example. The sealing strip comprises a hollow tubular soft sealing section which is supported around the door opening by means of a channel-shaped gripping section. In order to support the sealing section at positions around the opening where the sealing strip has to be curved or bent, lengths of soft flexible material of generally rectangular cross-section are positioned within the hollow interior of the sealing section at the appropriate positions. Each such length is a relatively loose fit within the hollow interior of the sealing section and is held in position by means of adhesive. The lengths of the soft flexible material prevent partial "collapse" or distortion of the sealing section at the bends or curves, but because they do not fill the hollow interior of the sealing section, they do not impair its compressibility in the sealing direction.

13 Claims, 4 Drawing Figures

HOLLOW REINFORCED SEALING STRIPS

BACKGROUND OF THE INVENTION

The invention relates to sealing strips such as, for example, sealing around door or window openings, in motor vehicles for example. More specifically it relates to sealing strips having hollow interiors.

An object of the invention is to improve the sealing effect of such sealing strips when bent round a curve or corner.

BRIEF SUMMARY OF THE INVENTION

According to the invention there is provided a sealing strip, comprising a length of soft flexible sealing material defining a longitudinally extending hollow interior, and a reinforcing member made of soft flexible material and positioned in the hollow interior of the sealing material at a position therein where it is to be curved, the reinforcing member being of such cross-sectional configuration and size and so held in the hollow interior that it extends substantially across the whole of the width of the hollow interior in one direction but extends across only a small proportion of the width of the hollow interior in the perpendicular direction, whereby to support the sealing material when it is curved with the said one direction lying in the plane of curvature and without substantially impairing the compressibility of the sealing member in the said perpendicular direction.

According to the invention, there is also provided a sealing strip for sealing around the periphery of an opening closable by a closure member, comprising a longitudinal support member for mounting around the opening, a longitudinal hollow tubular soft and flexible sealing member carried on the support member around the opening so as to be sealingly compressed by the closure member, and reinforcing means positioned within the hollow interior of the tubular member where the latter is curved to follow the bends in the said opening, the reinforcing means comprising at least one length of soft flexible material of substantially rectangular cross-section which is fixed in position within the said hollow interior so as substantially to fill the width thereacross in the direction which lies in the plane of curvature but so as to leave the width thereacross in the perpendicular direction substantially unfilled.

DESCRIPTION OF THE DRAWINGS

Sealing strips embodying the invention will now be described, by way of example, with reference to the accompanying drawings in which.

DESCRIPTION OF PREFERRED EMBODIMENTS

Figure 1:
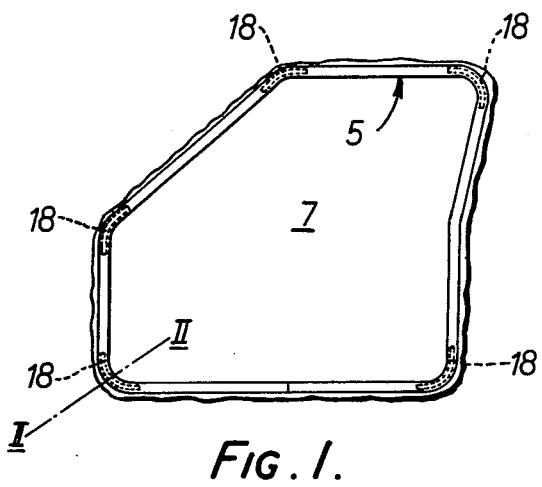
FIG. 1 is a side view of a sealing strip embodying the in-ention and fitted around a door opening on a vehicle body.

The sealing strip to be described with reference to the drawings is in this example intended for sealing around the door opening of a motor vehicle body. FIG. 1 shows the sealing strip 5 mounted around the door opening 7 (with the door itself not shown). The sealing strip 5 may be supplied to the vehicle body manufacturer in the form of a length which is cut off to suit the peripheral length of the door opening and then fitted into position. Instead, however, it may be partially or completely pre-formed to match the size and shape of the vehicle door opening.

Figure 2:
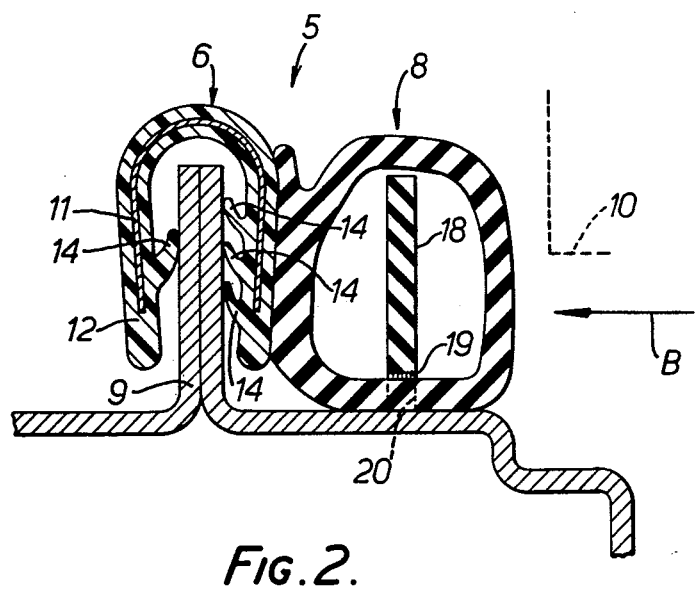
FIG. 2 is a cross-section on the line II—II of FIG. 1 to an enlarged scale.

As shown in FIG. 2, the sealing strip 5 comprises a channel-shaped gripping section 6 and a sealing section 8 which is shown as being in the form of a hollow tubular seal. The sealing strip 5 is mounted in position on the vehicle body by means of the gripping section 6 which is mounted on and clamped to a flange 9 on the vehicle body which runs around the door opening and lies substantially in the plane of the door opening. In this way, the gripping section 6 supports the sealing section 8 on the outside of and running around the door opening so that the door (shown dotted at 10 in FIG. 2) closes onto the sealing section 8 to provide a draught and weather seal.

The gripping section 6 comprises a channel-shaped core or carrier 11, such as made of metal, which is fully embedded in plastics or rubber material 12, such as by means of a cross-headed extrusion technique.

The carrier 11 may take any suitable form. For example, it may comprise a series of U-shaped metal elements arranged side-by-side and either connected together by connecting links or entirely disconnected from each other. Instead, it may be made of looped wire. Other forms of carrier may be used.

Advantageously, the plastics or rubber material 12 is formed to provide gripping lips 14 which extend inwardly from the opposite inside walls of the channel section 6 so as to make contact with the opposite sides of the door flange 9 and thus help to retain the gripping section in position on the flange.

The sealing section 8 is in the form of a hollow tube, made of rubber for example, and advantageously of sponge or foamed consistency, and is attached to the gripping section 6 so as to run along the outside of one of its side walls. The sealing section 8 may be attached to the gripping section 6 in any suitable way, such as by means of adhesive, by suitable mechanical interlocking means, or by being integrally extruded with the material 12 of the gripping section 6.

Within the region of the bend shown in FIG. 2, the sealing section 8 also incorporates a member of sponge material 18, such as sponge plastics or rubber material. The member 18 is of generally rectangular cross-section and is of sufficient length (about 10 centimeters for example) to extend along the sealing section 8 over that portion of the latter which is curved at the bend, as shown dotted in FIG. 1.

The member 18 may be a relatively loose fit within the sealing section 8 so that it may be easily pushed into position along the hollow interior of the sealing section 8, using a suitable tool. When in position, it is held there by means of a spot 19 of quick-acting adhesive which is inserted through the wall of the sealing section 8 via a small hole 20.

The hole 20 may be specially bored through the wall of the sealing section 8. Instead, use may be made of a suitably positioned one of the air holes which it is known to provide at intervals along the length of sealing section 8.

It is found that the member 18 may be held in position adequately by a single spot of adhesive inserted through a hole 20 positioned approximately centrally of the length of the member 18. Instead, however, more than one spot of adhesive may be provided, each inserted through suitably positioned holes.

It will be apparent that the member 18 is attached to the gripping section 8 along only one of its edges (the upper edge as viewed in FIG. 2); its lower edge is free.

Figure 3:
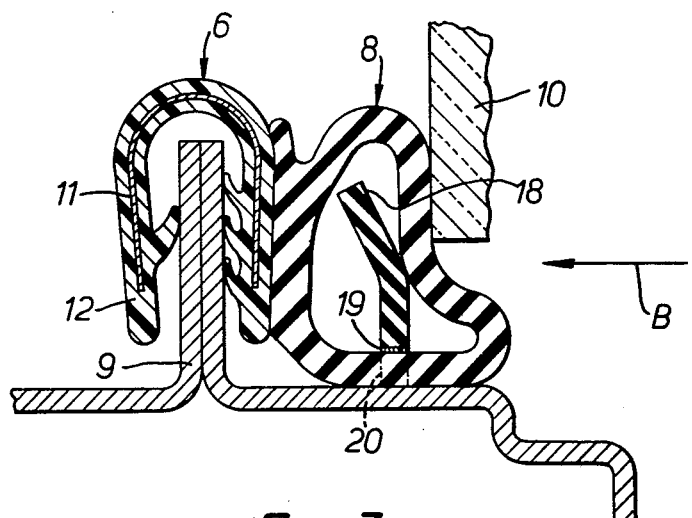
FIG. 3 is a cross-section corresponding to FIG. 2 but showing the sealing strip being compressed by the door closing the opening.

Reinforcing members similar to the member 18 shown in FIG. 3 may be positioned at each of the bends or corners in the sealing strip and each such member may be of similar configuration and length to the member 18 and held in position in similar fashion.

In use, it is found that the members 18 support the sealing section 8 so that its positional relationship with the gripping section 6 is maintained around the curves or bends of the sealing strip. In the absence of the reinforcing members 18, it is found that the sealing section 8 tends to become distorted at the bends or corners in the sealing strip, normally by tending to "collapse", that is, to flatten from its generally cylindrical shape. Not only does this give an unsightly appearance but, more importantly, it means that the sealing section 8 is not properly positioned to carry out its sealing function. This tendency to collapse is significantly reduced by the reinforcing members 18.

It will be appreciated that the reinforcing members 18 need not be of exactly the configuration shown.

It will be appreciated that the reinforcing members 18 are advantageous in that, although they are very effective in preventing distortion of the sealing section at the bends or corners in the sealing strip, they have substantially no adverse effect on the compressibility of the sealing section 8 in response to closure of the door (which applies a compressive force in the direction of the arrow B). They are therefore advantageous as compared with lengths of tubular material which may be inserted into the sealing section 8 at the positions where bends or corners are required, such tubular members substantially filling the hollow space within the sealing section so that, although they may provide the desired support for the sealing section 8 in the region of the bends or corners, they impair its compressibility and thus its sealing ability. FIG. 3 shows how the member 18 can swing away when the sealing section 8 is compressed by the closing door 10.

Instead of being pushed into position along the length of the sealing section 8, it is possible to insert the member 18 by stretching a suitably positioned one of the normal air holes in the section 8 (or by making a special hole) and pushing the member through.

Figure 4:
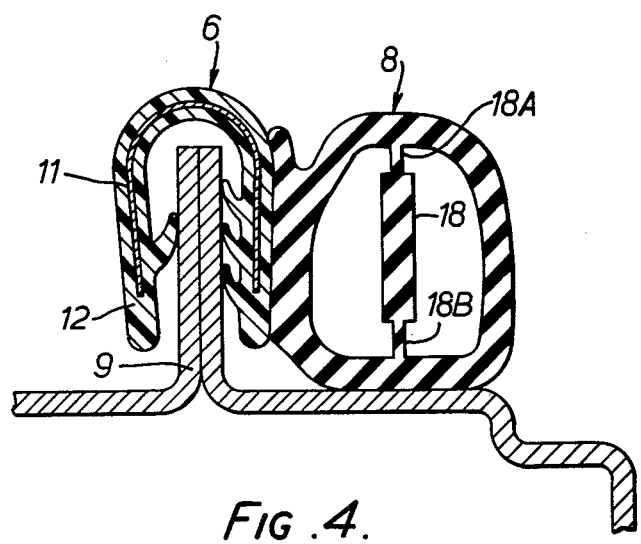
FIG. 4 is a cross-section corresponding to FIG. 2 but showing a modified construction.

FIG. 4 shows a modified arrangement in which the member 18 is integrally extruded with the material of the sealing section and attached thereto by thin integral webs 18A and 18B. In such a case the member 18 could extend continuously along the length of the sealing section (even though its supporting effect would only be required at the bends or curves). One of the webs 18A, 18B could be made weaker than the other so as to break in use, thus leaving the member 18 supported along one edge only.

What is claimed is:

1. A sealing strip, comprising
a length of soft flexible sealing material defining a longitudinally extending hollow interior, and
a reinforcing member made of soft flexible material integral with the sealing material and positioned in the hollow interior of the sealing material at a position therein where the sealing material is to be curved,
the reinforcing member being of narrow strip-like cross-sectional configuration and having integral reduced-thickness webs running along the edges of it which define its width, the webs being integrally joined with the sealing material so that the width of the reinforcing member extends across the whole of the width of the hollow interior in one direction thereacross but extends across only a small proportion of the width of the hollow interior in the perpendicular direction, whereby to support the sealing material when it is curved with the said one direction lying in the plane of curvature and without substantially impairing the compressibility of the sealing material in the said perpendicular direction.

2. A sealing strip, comprising
a length of soft flexible sealing material defining a longitudinally extending hollow interior, and a reinforcing member made of soft flexible material and positioned in the hollow interior of the sealing material at a position therein where the sealing material is to be curved,
the said reinforcing member being of narrow rectangular cross-sectional configuration and size and held in position within the hollow interior by means of one of its edges only, so that it extends substantially across the whole of the width of the hollow interior in one direction but extends across only a small proportion of the width of the hollow interior in the perpendicular direction, whereby to support the sealing material when it is curved with the said one direction lying in the plane of curvature and without substantially impairing the compressibility of the sealing material in the said perpendicular direction.

3. A strip according to claim 2, in which the said member is held in position by means of adhesive.

4. A strip according to claim 3, in which the adhesive is positioned at the apex of the said curve.

5. A strip according to claim 1, in which the said member is extruded integrally with the sealing material.

6. A strip according to claim 1, including
a channel-shaped longitudinally extending member, and in which the length of sealing material is mounted on and attached to one outside wall of the channel-shaped member which is adapted to hold the length of sealing material in position in use.

7. A strip according to claim 2, in which the reinforcing member is made of sponge rubber.

8. A strip according to claim 1, in which the sealing material and the reinforcing member are made of sponge rubber.

9. A strip according to claim 6 in which the channel-shaped member is made of channel-shaped material having a reinforcing carrier within it.

10. A strip according to claim 9, in which the channel-shaped material defines a plurality of gripping and sealing lips running along and extending inwardly from its opposite inside walls.

11. A strip according to claim 2, including channel-shaped longitudinally extending material having a reinforcing carrier within it, and in which the length of sealing material is mounted on and attached to one outside wall of the channel-shaped material which is adapted to hold the length of sealing material in position in use.

12. A strip according to claim 11, in which the channel-shaped material defines a plurality of gripping and sealing lips running along and extending inwardly from its opposite inside walls.

13. A strip according to claim 2, in which the reinforcing member is made of sponge rubber.

* * * * *